May 26, 1936. E. B. WALTON 2,041,886
REENFORCED SLATE TILE
Filed Nov. 12, 1935 2 Sheets-Sheet 1
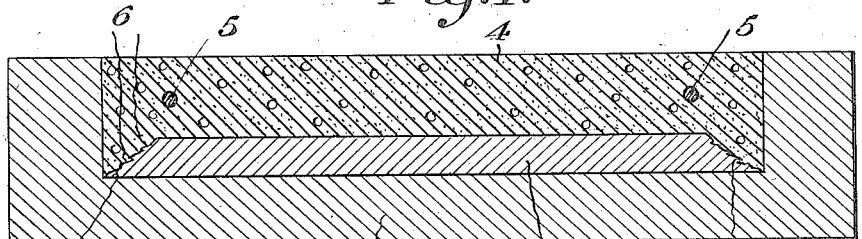
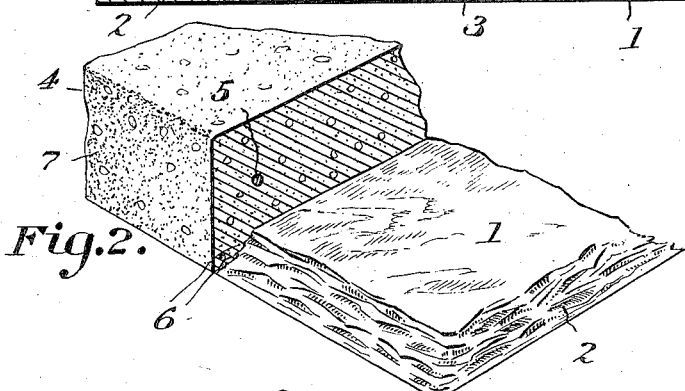
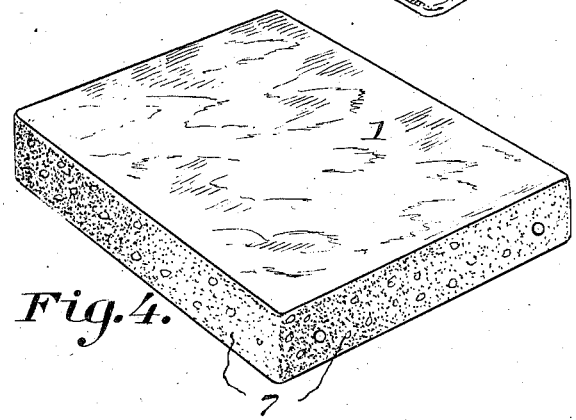
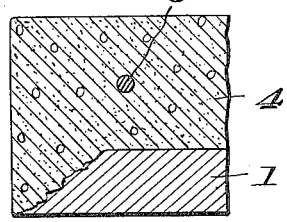
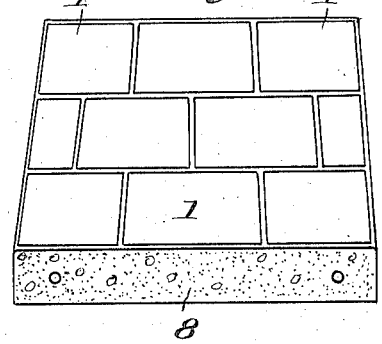
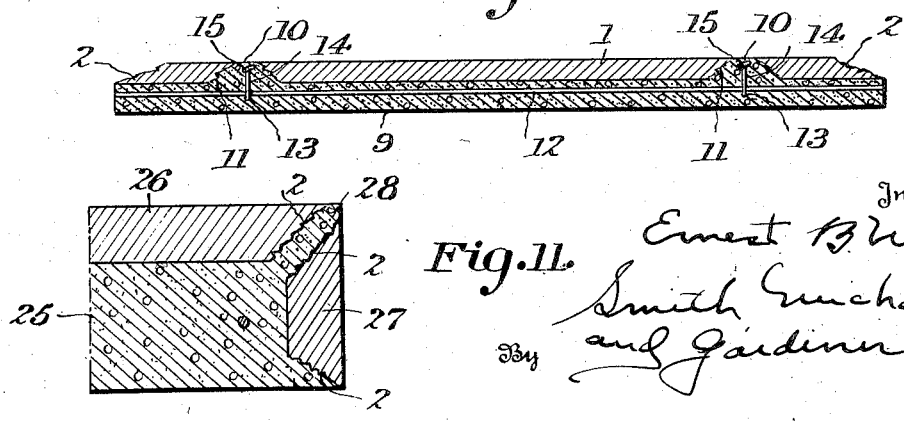
Inventor
Ernest B Walton
By Smith, Michael and Gardiner
Attorney May 26, 1936.　　　　E. B. WALTON　　　　2,041,886
REENFORCED SLATE TILE
Filed Nov. 12, 1935　　　2 Sheets-Sheet 2
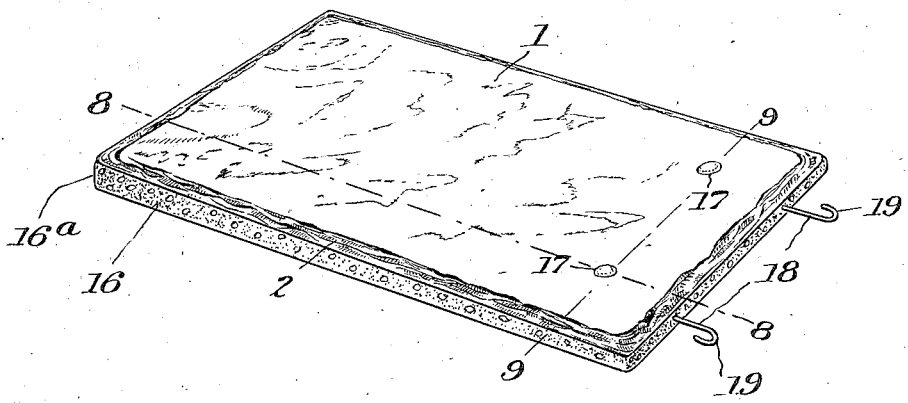
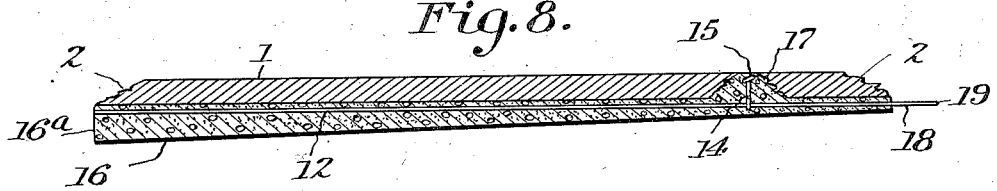
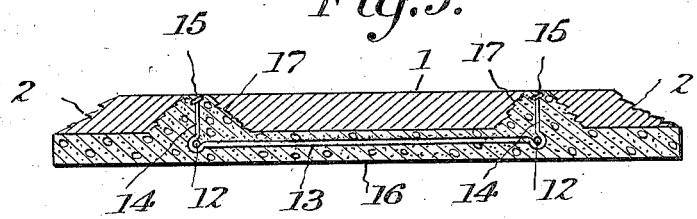
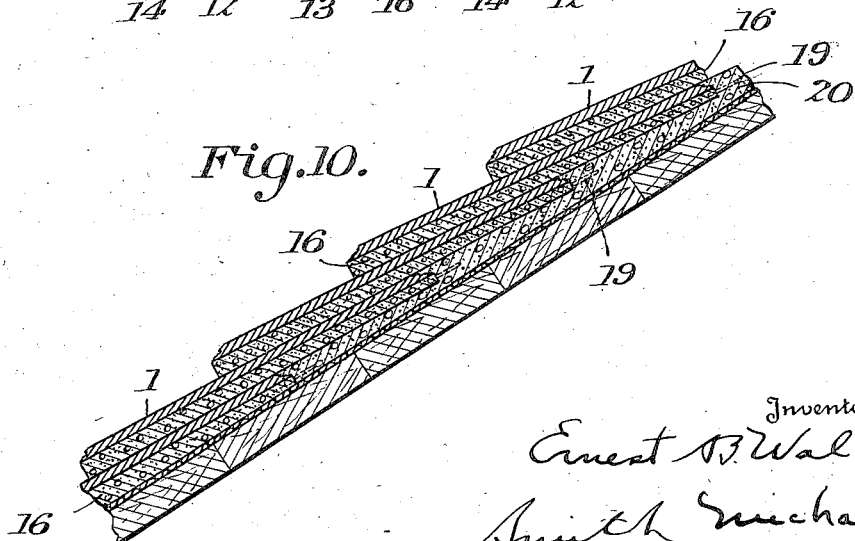
Inventor
Ernest B Walton
By Smith Michael and Gardiner
Attorney Patented May 26, 1936

2,041,886

UNITED STATES PATENT OFFICE 2,041,886

REENFORCED SLATE TILE

Ernest B. Walton, West Palm Beach, Fla.

Application November 12, 1935, Serial No. 49,423

2 Claims. (Cl. 72—36)

This invention relates generally to building tile of the character widely used in the construction of floors, walls, ceilings, roofs and the like, and has particular reference to veneered or faced tile having a rigid reenforced backing of suitable hardened plastic material such as hydraulic cement and the like.

Of recent years there has been a constantly growing demand in the building trade for heavy slate tile for use in flooring outside terraces, building outside walks, and similar uses where heretofore flagstone and similar materials have been used. This growing demand is attributable largely to recent architectural developments in respect to Colonial buildings, particularly private residences, wherein slate is specified for use in the instances noted, instead of flagstone or similar material previously used, because this particular type of architecture requires that slate be used in order to more rigidly adhere to Colonial custom in this respect.

Heretofore slate of the character required in this particular type of architecture must be extremely thick to withstand the severe use it receives in outside walks, terraces, roofs and the like, and it is not unusual that the building specifications call for slate ranging from an inch to two inches or more in thickness. Obviously, slate of this thickness is extremely heavy when considered from a standpoint of unit area and is also extremely expensive when considered from the same standpoint. Due to the abnormal weight of slate of this thickness, freight charges for transporting the same from the quarries to the building site are abnormally high. The problem is further aggravated by the fact that the slate as quarried is relatively non-uniform as to thickness, a given piece varying in thickness as much as a half or three-quarters of an inch from one edge to another. This variation in thickness requires that the foundation or bed in which the slate is set, be especially tooled to accommodate the varying thickness and other surface irregularities of each piece of slate as it is laid. Considering these several factors, therefore, it is at once apparent that the cost of laying such slate in walls, terrace floors, walks, roofs and the like is prohibitive, particularly in locations remote from the quarries, and having these facts in mind, I have developed a slate tile of the veneered or faced type which may be used in all instances in which the thick slate above referred to is employed and wherein the cost of the tile and laying the same is reduced to a figure which places it well within usual building costs allowed for walks, terraces and the like.

The tile forming the subject-matter of my invention comprises a facing sheet or veneer of relatively thin slate having secured thereto a relatively thick reenforcing backing of hydraulic cement or the like.

In making tiles of the character forming the subject-matter of this invention, I prefer to use trimmed slate in contradistinction to sawed slate so that the inherent characteristic of slate, when trimmed, to expose rough serrated superposed offset edges of the natural strata or laminations of the slate may be employed for effectively bonding, keying, or otherwise securing the rigid reenforcing back to the relatively thin facing or veneer.

The invention contemplates faced or veneered tile of the character referred to which may be used in making floors, walls, walks, roofs, ceilings or in any other instances wherein tile is generally employed. In some forms of tile, I provide means for facilitating the attachment of the tile to a supporting base, such as embedding structural reenforcements in the backing material and allowing these elements to project beyond the edges of the tile and to be used in attaching the tile to a supporting surface.

The invention further contemplates several novel means of increasing the effectiveness of the bond between the veneer face and the backing.

These and other objects of the invention will become apparent from a reading of the following specification in connection with the accompanying drawings, wherein I have illustrated several preferred embodiments of my invention, the novel and important features of which have been set forth more in detail in the appended claims.

In the accompanying drawings:

Figure 1 is a transverse sectional view of a slate veneer disposed in a mold such as used in making tiles of this invention.

Fig. 2 is a fragmental perspective view, partly in section, showing the manner in which the reenforcing back is keyed into the laminations of the slate.

Fig. 3 is a fragmental sectional view through a finished tile showing a region adjacent one edge thereof.

Fig. 4 is a perspective view showing a finished tile.

Fig. 5 is a perspective view of a modified form of tile wherein several pieces of slate veneer are attached to a unitary reenforcing back.

Fig. 6 is a longitudinal sectional view of a tile showing means for bonding the backing material to the slate veneer.

Fig. 7 is a perspective view of a further modified form of my invention as applied to a roofing tile.

Fig. 8 is a longitudinal sectional view taken on the line 8—8 of Fig. 7.

Fig. 9 is a transverse sectional view taken on the line 9—9 of Fig. 7.

Fig. 10 is a fragmentary sectional view of a roof showing the manner in which the tile shown in Fig. 7 may be laid.

Fig. 11 is a sectional view showing a tile used as a coping and having two of its faces provided with slate veneer.

Referring more particularly to the accompanying drawings wherein like reference numerals are used to designate like parts throughout, I indicates a sheet of relatively thin slate designed to form the face or veneer of a finished tile. The slate I may be of any desired thickness depending upon the use to which the finished article is to be placed, but I have found in practice that a thickness of approximately one-quarter of an inch is satisfactory for most purposes. It is to be understood, however, that in actual practice, sheets of slate or veneer of any desired thickness may be employed without departing from the spirit of the invention.

As hereinbefore indicated, I employ trimmed slate, as trimmed slate is characterized by exposed raw, rough edges of superposed stepped strata of the natural laminations of the slate, as clearly indicated at 2 in the drawings. The rough edges resulting from the trimming operation are further characterized by an inclination or bevel, clearly shown in Figs. 1 and 3. The degree or extent to which this bevel may be carried depends upon the thickness of the slate veneer used and the relative degree of offset of the trimming tools. It is to be understood, of course, that the mode of trimming the slate veneer forms no part of the present invention, this being well known to skilled slate workers, and comprising essentially supporting the slate veneer on a surface having straight edges arranged to define one line of break or cleavage and a tool having edges arranged substantially parallel to the first edge and offset with reference thereto an amount depending upon the extent and inclination of the bevel desired. When the tool as thus positioned is urged towards a supporting surface, the slate sheet is sheared or fractured along a generally beveled and inclined edge or surface, the texture of which is characterized by the presence of a multiplicity of exposed, overlapping, offset raw edges of the natural lamination of the slate, as clearly shown in Fig. 2.

As suggested in Fig. 1, a piece of trimmed slate veneer of a size depending upon the size of the finished tile desired, is placed in the bottom of a sectional mold, such as indicated at 3 in Fig. 1, with the rough beveled edges 2 uppermost, and the mold then filled with any suitable plastic backing material such as hydraulic cement 4. The backing material may include embedded structural reenforcing elements 5, if desired, to further reenforce and strengthen the finished tile. By thus molding the plastic material to the slate veneer it is apparent that the material of the back will penetrate into the interstices formed by the rough, raw, exposed edges of the natural laminations of the slate, and form a multiplicity of keying or bonding portions between the back 4 and the facing or veneer I. These keying or bonding portions are indicated in the drawings by the numeral 6.

As shown in Fig. 4, the material for the back of the tile is arranged to completely embrace and cover all of the exposed rough edges of the tile so that the completed article is characterized by relatively straight, smooth, substantially vertical edge surfaces 7 and a top or exposed face of slate. Thus, when the tile is set in a suitable bed it has the same outward appearance as the heavy slate slabs or tiles used prior to the development of this invention. If desired, two or more of the slate veneers I may be attached to a single back, such as 8, this arrangement being shown in Fig. 5. It will be understood in connection with this form of the invention that the several pieces of slate veneer I secured to the back 8 may be arranged to form any suitable design such as may be depicted in a finished wall, ceiling, floor or the like, and that the several pieces of veneer attached to the back sheet may be the same color or any desired contrasting color.

In some instances it is desirable to provide slate tiles having exposed trimmed edges, and my invention contemplates the provision of reenforced tile of this character. Referring to Fig. 6, it will be noted that the facing I is secured to a reenforced back 9 in a manner such that the exposed face of the tile reveals the rough laminated beveled edges 2 resulting from the trimming operation hereinbefore referred to. In making this form of the tile it is apparent that the slate veneer is positioned in the mold with the beveled rough edges 2 in opposed relation to the mold bottom so that in a finished tile these edges remain free of the material of the back. In order to provide an effective bond between the back 9 and the veneer sheet I in this form of the invention, I have found it desirable to puncture or perforate the slate sheet at one or more points by openings 10, as shown. These openings are formed in a manner to provide substantially conical wall surfaces 11, and these wall surfaces are characterized by the same exposed raw offset superposed strata of the natural laminations of the slate, and thus afford a multiplicity of cavities into which the material of the back may key to form an effective bond between the back 9 and veneer face I. In this form of the invention I have shown additional means for enhancing the bonding action between the back 9 and the facing sheet I, said means comprising structural reenforcing elements 12 embedded in the material of the back 9 and disposed substantially parallel to the facing sheet I. I also provide additional structural reenforcing elements which, as shown in Fig. 9, are substantially U-shaped in general configuration, and are arranged with the bridge portion 13 thereof embracing the elements 12 with the legs 14 of the U-formation projecting upwardly and terminating within the openings 10 formed in the veneer sheet I. The leg portions 14 preferably are provided at their terminal portions with transversely disposed head portions 15 to enhance the bonding action between said elements and the material of the back. A tile fashioned in this manner has its veneer face I securely bonded to the back 9 and at the same time carries the rough beveled trimmed edges 2 exposed to view.

The method of bonding or keying the backing of reenforced tile such as contemplated by this invention and as shown in Fig. 6, is of particular utility in connection with roofing tile where it is desired to have the rough beveled edge of the tile exposed for ornamental and decorative effects. Thus, as shown in Fig. 7, a rigid backing 16 may be attached to a veneer face 1 having exposed beveled roughened edges 2, it being noted that in the particular arrangement shown in Fig. 7, the backing 16 is of greater thickness at the lower or butt end 16ᵃ of the tile than it is at the top or upper end 16 thereof. This thickened butt end of the tile is of advantage in laying the tiles in superposed relation on a roof, such as the arrangement shown in Fig. 10, in order to maintain the adjacent faces of superposed shingles in substantial parallelism. The backing 16 is secured to the veneer sheet 1 through the instrumentality of openings 17 formed in said veneer and into which the material of the backing flows during the molding operation, similar in all respects to the disclosure of Fig. 6. The tile shown in Fig. 7 is provided with suitable structural reenforcing elements which, in this particular form of the invention, may project beyond the upper extremity of the tile as at 18 and terminate in attaching features 19, which elements are used to facilitate securing the tile in place upon a roof. For example, suitable fastening elements may be interengaged with the elements 19 and driven into the framework which supports the roof, or these attaching elements 19 may be embedded in hydraulic cement or other suitable binding material which may be utilized in placing the shingles on a roof structure.

The manner of securing reenforced tile such as shown in Fig. 7 upon a roof structure by means of hydraulic cement or other suitable binder is clearly illustrated in Fig. 10, wherein the roofing tiles, such as illustrated in Fig. 7, are staggered in superposed relation, the elements 19 being embedded in a bed 20 of a suitable binder such as hydraulic cement and the like. It is apparent from a consideration of this view that a roof is provided wherein all necessity of driving nails, spikes or similar securing means into the structure of the roof is dispensed with, thereby minimizing the possibility of leaks from this source. It is also to be noted in this connection that the openings 17 provided in this form of roofing tile are arranged relatively close to the upper end of the shingle so that when laid upon a roof as shown in Fig. 9, these openings are respectively covered in each instance by the overlying shingle. Thus, in the finished roof, the openings formed in the veneer and into which the material of the backing is keyed, are entirely invisible.

From the foregoing description it is apparent that I have devised a reenforced tile having a relatively thin face or veneer of slate, and utilize the cavities or interstices formed by and between the natural laminations of the slate when portions thereof are trimmed to expose raw edges of these laminations, for the purpose of increasing or enhancing the bonding between the backing and veneer. This feature of my invention may be utilized to provide tile of the form shown in Fig. 4 wherein only the smooth upper surface of the veneer is exposed and all of the rough beveled side edges thereof lie embedded in the material of the back, or tiles such as shown in Figs. 6 and 7 wherein the rough beveled edge of the trimmed slate veneer is exposed for decorative effects and the back securely bonded to the veneer through the instrumentality of one or more openings penetrating the veneer to provide bonding cavities in the conical walls defining said openings, similar in all respects to the cavities formed on the rough beveled edge of the tile, as shown in Fig. 2.

It is also apparent that in addition to the remarkable bonding accruing from the multiplicity of cavities formed in the edges of trimmed slate as hereinbefore referred to, I have devised means for further increasing the bonding action between the backing and the veneer by associating with the backing, structural reenforcing elements terminating in headed extremities disposed within openings formed in the body of the veneer.

By my invention as thus described I can manufacture and lay tile for approximately one-third of the cost necessary to lay heavy slate tile heretofore used, without sacrificing any of the architectural or decorative effects inherent in slate as distinguished from flagstone, particularly surface characteristics, contrasting colors, and long wearing qualities. In this connection it is to be noted that even the thick slate slabs heretofore used must be cut to given dimensions before being laid and, due to their thickness, this cutting can only be done on power operated saws. This machinery is expensive and the operation is costly. However, in trimming slate of the thickness used in the veneer or facing sheets of my tile, small manually operated trimming devices can be used so that the veneer sheets used in the manufacture of the tile forming the subject-matter of this invention can be trimmed for a small fraction of the cost involved in cutting the thick slate slabs to specified dimensions.

It is also to be noted that tiles of the present invention, with the exception of the roofing tiles shown particularly in Fig. 7, are of uniform thickness, so that they may be quickly and easily laid on a conventional base or foundation without the necessity for tooling or shaping the bed to take individual tiles, as is necessary when the thick heavy slabs of slate having irregular thickness are employed.

In some instances it is desirable to provide a tile having a slate facing on two or more surfaces, particularly where it is desired to build a coping, or in any instance where it is desired to provide a finished exposed edge surface for the tile. In Fig. 11 I have shown a sectional view of this form of my invention wherein the tile comprises the usual backing 25 which supports veneer facings of slate 26 and 27 on angularly disposed edges of the tile so that when the tile is laid in a coping or step tread the edge surfaces 27 as well as the top surfaces 26 will be exposed to view and provide a finished ornamental appearance for the tile. Note that in this form of the invention the adjacent beveled rough edge surfaces 2, 2 of the pieces of veneer 26 and 27 are separated an appreciable distance to provide an exposed edge of the hydraulic cement or other material of the backing 25, as shown at 28.

It is to be noted that the essential features of my invention as illustrated in Figs. 6 to 10 inclusive form the subject-matter of my copending application Serial No. 61,622 filed Jan. 20, 1936, entitled "Composite roofing tile", said application being a continuation in part of the present application.

It will be understood that while I have chosen to disclose certain preferred embodiments of my invention in the foregoing application and accompanying drawings, such disclosures are for the purpose of example only, as the novel features of my invention have been pointed out more particularly in the appended claims, and it is to be understood that I reserve the right to make such changes in construction and arrangement of parts as fairly fall within the scope of the appended claims without departing from the spirit of my invention.

Having thus described the invention what I claim is:

1. A building tile comprising, a backing of hydraulic cement or the like, said backing having embedded in adjacent faces thereof trimmed slate veneer having undercut edges, the slate veneer on adjacent faces being spaced from the intervening edge of the backing whereby to provide an exposed edge of the backing between said slate veneers, said exposed edge of the backing material being substantially coincident with the line of intersection of the planes of the exposed faces of the veneer.

2. A building tile comprising a backing of hydraulic cement or the like, said backing having embedded in adjacent faces thereof trimmed slate veneer defining the exposed faces of the tile, said veneers being provided with rough beveled undercut edges, the adjacent edges of the veneer on adjacent faces of the block being arranged in closely adjacent opposed relation and present irregularly disposed inter-laminae cavities and projections, the material of the backing penetrating into the space between said opposed edges and interlocking with said cavities and projections to securely bond the veneers to the backing, that portion of the material of the back penetrating between said opposed edges of the veneers terminating in surfaces which are, respectively, flush with the exposed faces of the respective veneers to reenforce the thin edge portions of the veneer and to provide an exposed edge of the tile of said backing material.

ERNEST B. WALTON.